United States Patent [19]

Torita et al.

[11] 4,136,819
[45] Jan. 30, 1979

[54] CARD PROCESSING APPARATUS

[75] Inventors: Tomohiko Torita, Chichibu; Toru Okada, Kumagaya; Yuji Yokota, Chichibu, all of Japan

[73] Assignees: Canon Kabushiki Kaisha, Tokyo; Canon Denshi Kabushiki Kaisha, Saitama, both of Japan

[21] Appl. No.: 726,753

[22] Filed: Sep. 27, 1976

[30] Foreign Application Priority Data

| Sep. 29, 1975 | [JP] | Japan | 50-117523 |
| Oct. 8, 1975 | [JP] | Japan | 50-121503 |
| Oct. 17, 1975 | [JP] | Japan | 50-125105 |
| Oct. 21, 1975 | [JP] | Japan | 50-126554 |
| Oct. 21, 1975 | [JP] | Japan | 50-126555 |
| Oct. 21, 1975 | [JP] | Japan | 50-126556 |
| Nov. 10, 1975 | [JP] | Japan | 50-134841 |

[51] Int. Cl.$^2$ .................... G06K 7/02; G06K 1/20; G06K 7/08; G06K 13/00
[52] U.S. Cl. .................... 235/431; 234/35; 235/449; 235/476
[58] Field of Search .................... 235/61.11 R, 61.7 R, 235/61.7 B, 449, 475, 476, 480; 101/92; 234/35

[56] References Cited

U.S. PATENT DOCUMENTS

| 3,519,202 | 7/1970 | Rogers | 235/61.11 R |
| 3,602,139 | 8/1971 | Allport | 235/61.11 R |
| 3,609,303 | 9/1971 | Marshall et al. | 235/61.11 R |
| 3,617,706 | 11/1971 | Oberhart | 235/61.11 R |
| 3,745,919 | 7/1973 | Wattenburg et al. | 235/61.11 R |
| 3,878,364 | 4/1975 | Mack et al. | 235/61.11 R |

Primary Examiner—Daryl W. Cook
Attorney, Agent, or Firm—Fitzpatrick, Cella, Harper & Scinto

[57] ABSTRACT

This specification discloses a card processing apparatus which is constructed such that a card having information recorded thereon and a paper leaf are superposedly placed on card tray movably disposed in an opening formed within the housing of the apparatus and the following card processing is carried out by pushing the card tray into the interior of the housing: first, the card and the paper leaf are separated from each other and the card alone is transported so that first information recorded on the card is read by reader means, whereafter the card is transported back to the card tray to restore its initial position; next, information extraneously entered is compared with the first information read from the card and only when the two types of information are identical, urge means is operated to urge the superposed card and paper leaf, whereby second information recorded on the card is recorded onto the paper leaf.

47 Claims, 24 Drawing Figures

FIG. 6(A)
FIG. 6(B)
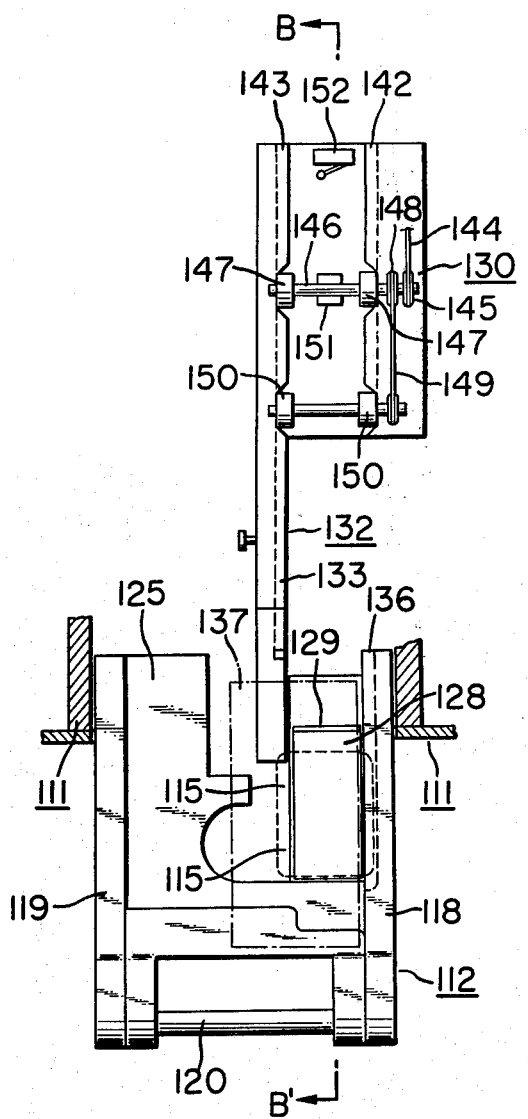
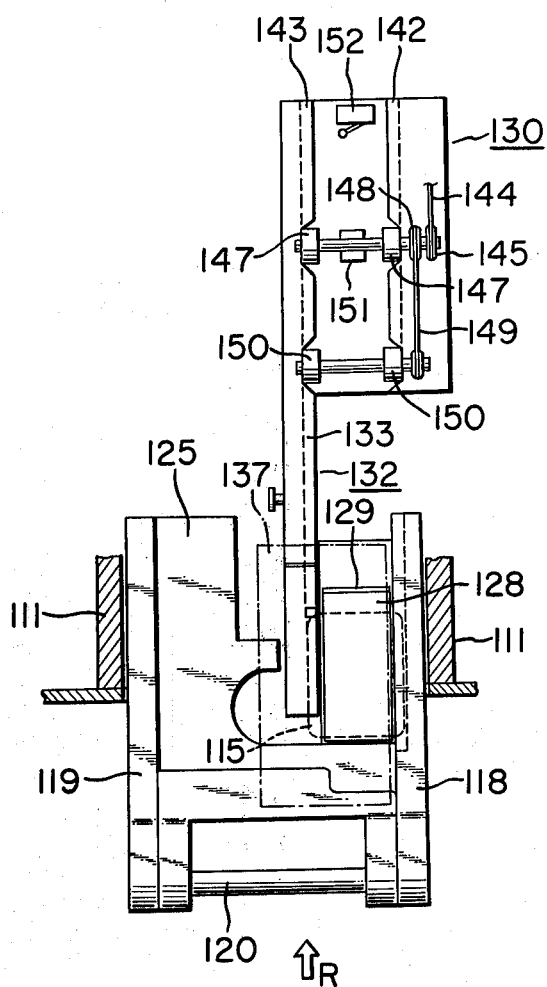

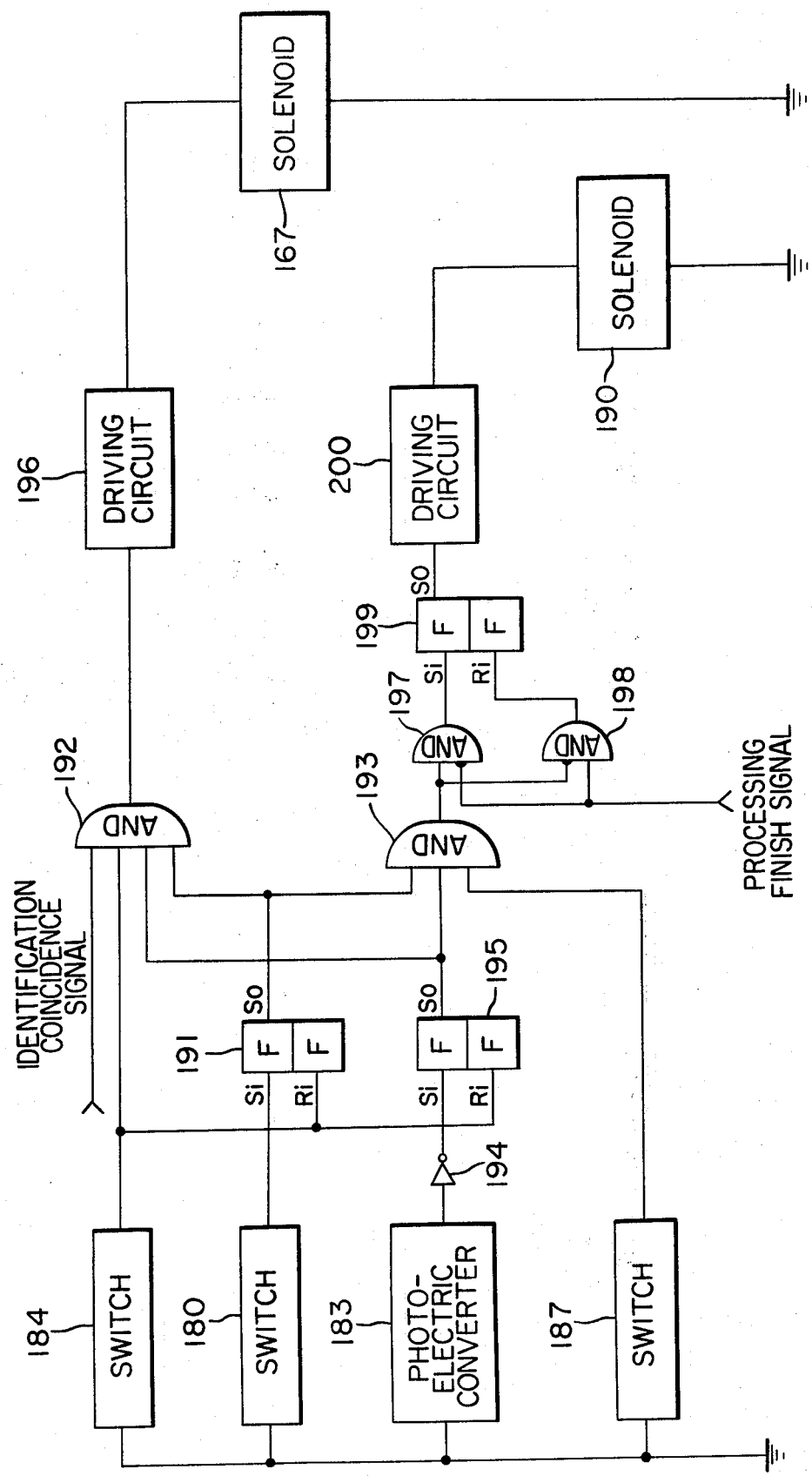

CARD PROCESSING APPARATUS

BACKGROUND OF THE INVENTION

1. Field of the Invention

This invention relates to a card processing apparatus having card rest means (card tray), and more particularly to a card processing apparatus in which a card resting on the card rest means may be transported to reader means for reading information recorded on the card.

2. Description of the Prior Art

A card processing apparatus is known in which a card may be nipped between rollers so that information recorded on the card may be read. Such a conventional card processing apparatus has been of the type in which the card is manually inserted into the nip between the rollers and therefore, the card might sometimes be inclined when nipped, and the occurrence of such inclination might have caused inconvenience to the subsequent transport of the card. In a further apparatus which has been provided with a guide to avoid the above-noted problem, an introduction means has been provided to the opening of the guide to facilitate the insertion of the card, whereas the conventional introduction means which has been provided simply by enlarging the opening could not sufficiently perform its function in terms of the ease with which the card may be inserted, the accuracy with which the card position may be confirmed, etc. Further, when the information recorded on the card was to be transferred onto a paper leaf, the conventional card processing apparatus has involved the procedures of letting the card and the paper leaf be nipped separately between respective pairs of rollers.

SUMMARY OF THE INVENTION

It is a first object of the present invention to facilitate the insertion of the card into transport means and ensure the confirmation of the position of the card by placing the card on a card tray and then transporting the card.

It is a second object of the present invention to enable the card and a paper leaf to rest in superposed relationship on the card tray and to provide separator means for the separation of the card and the paper leaf, thereby directing the transport means solely to the transport of the card and thus achieving simplification of the transport means, which may in turn lead to such advantages as compactness of the apparatus, decreased troubles during the transport of the card, and lower cost of the apparatus.

It is a third object of the present invention to enable the information extraneously entered to be compared with the information read from the card to thereby operate an ink roller which may be rotated by the card tray being drawn from the apparatus body, thus eliminating such electrical parts as a motor and the like and achieving enhanced reliability and lower cost of the apparatus.

To achieve these objects, the card processing apparatus according to the present invention may basically comprise a housing having an opening therein, rest means movably disposed within the opening of the housing and having a card rest portion on which a card having information recorded thereon may rest, reader means disposed within the housing for reading the recorded information from the card when the card rests on the card rest portion of the rest means, and transport means for transporting the card on the card rest portion to the reader means by the rest means being moved within the opening and inwardly of the housing.

The above objects and other features of the present invention will become fully apparent from the following detailed description of some embodiments of the invention taken in conjunction with the accompanying drawings.

BRIEF DESCRIPTION OF THE DRAWINGS

FIGS. 1 to 11 show a first embodiment of the displace means in the card processing apparatus according to the present invention, FIG. 1 being a perspective view of the card processing apparatus to which the present invention is applied, FIG. 2 being a front view of a card, FIG. 3 being a perspective view of a card tray (rest means) and card reader (reader means), FIG. 4 being a top plan view of the tray, FIGS. 5A and 5B being cross-sectional views taken along line A—A' in FIG. 4 and illustrating the displacement of the card rest portion resulting from movement of the tray, FIG. 5C being a side view of the base portion of the tray, FIGS. 6A, 6B and 6C being top plan views for illustrating the relations between the tray and the card reader, FIGS. 7A and 7B being cross-sectional views taken along lines B—B' in FIGS. 6A and 6C, FIG. 8 being a perspective view of the drive system for the driving roller, FIGS. 9A and 9B being a perspective view and a side view, respectively, for illustrating the card tray and the ink roller (urge means), FIGS. 10A and 10B being a partly exploded perspective view and a side view, respectively, of a clip, FIG. 11 being a block diagram of the control circuit.

FIGS. 12 and 13A through 14B, show a second embodiment of the displace means in the card processing apparatus according to the present invention, FIG. 12 being a perspective view of the card tray, and FIGS. 13A, 13B and 13C are cross-sectional views of the apparatus body and card tray for illustrating the operation of the present invention.

FIGS. 14A and 14B are cross-sectional views for illustrating the operation of a third embodiment of the displace means in the card processing apparatus according to the present invention.

DESCRIPTION OF THE PREFERRED EMBODIMENTS

Figure 1:
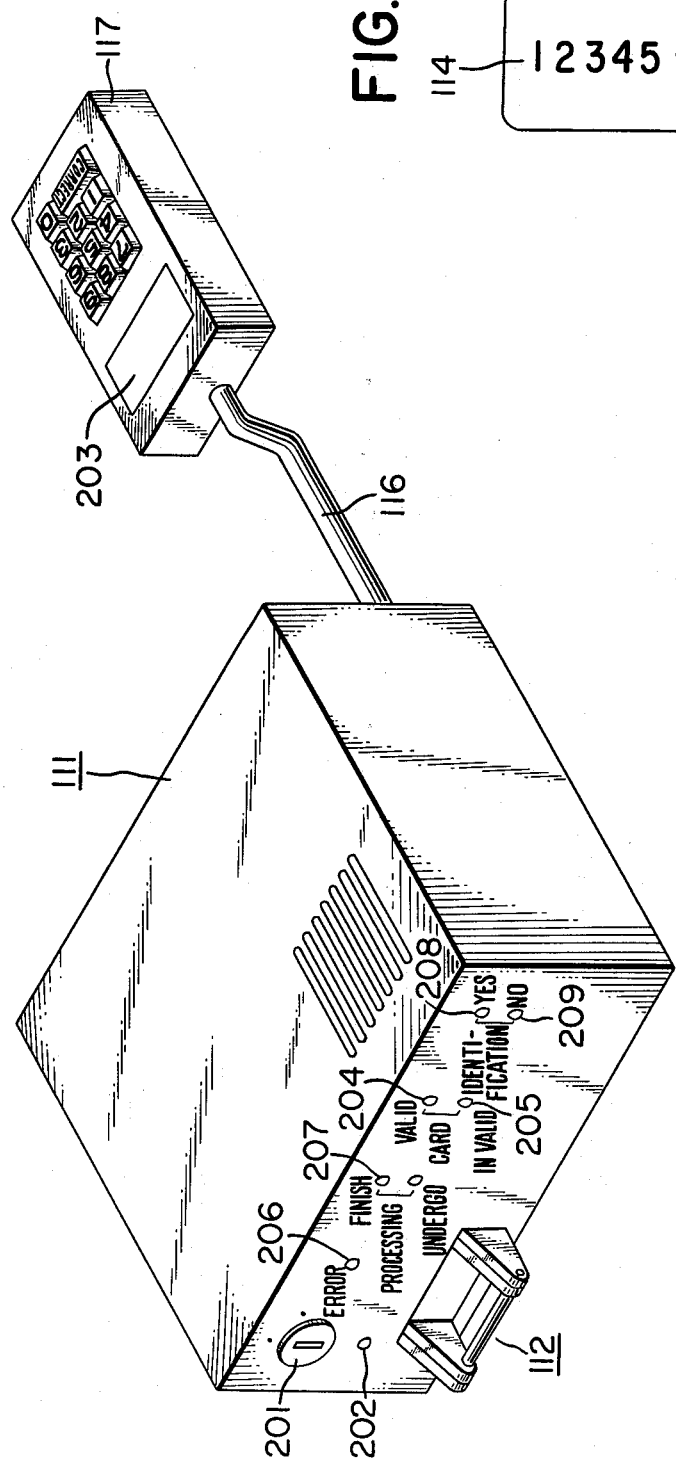

The invention will first be described with respect to a first embodiment by reference to the drawings. FIG. 1 shows a card processing apparatus used in banks or similar offices for processing cards by checking whether the bearers of the cards are the true owners of the cards or not. Such an apparatus may be used in such a manner that a bank clerk draws out a movable tray (rest means) 112 formed in a portion of the apparatus body (housing) 111 (in FIG. 1, the tray 112 is shown in its pushed-in position with respect to the apparatus body), and a card 115 entrusted to the clerk by a customer and having an information zone 113 carrying magnetically recorded information therein and embossed characters 114 and a slip (paper leaf) issued in accordance with the card are superposed upon each other and placed on the tray 112, whereafter the tray 112 is pushed-in to have the magnetically recorded invisible identification number read from the card by an unshown mechanism within the apparatus body, whereafter the information so read is stored in an unshown memory device.

In the above-described position, the bearer of the card (namely, the customer) may be made to enter his invisible identification number as input from a keyboard (information input means) 117 electrically connected to the apparatus body by a cord 116, whereby the invisible identification number obtained from the card may be compared with the invisible identification number entered from the keyboard and if the two are coincident with each other, the embossed characters on the card may be recorded on the slip and if the two are not coincident, the embossed characters on the card may not be recorded on the slip.

Thus, by confirming the issued bill, it can be known that transfer of money has been done between the bank and the true owner of the card, and the recording onto the slip is effected by means of the embossed characters themselves, and this may make it difficult to commit forgery of slips.

Figure 3:
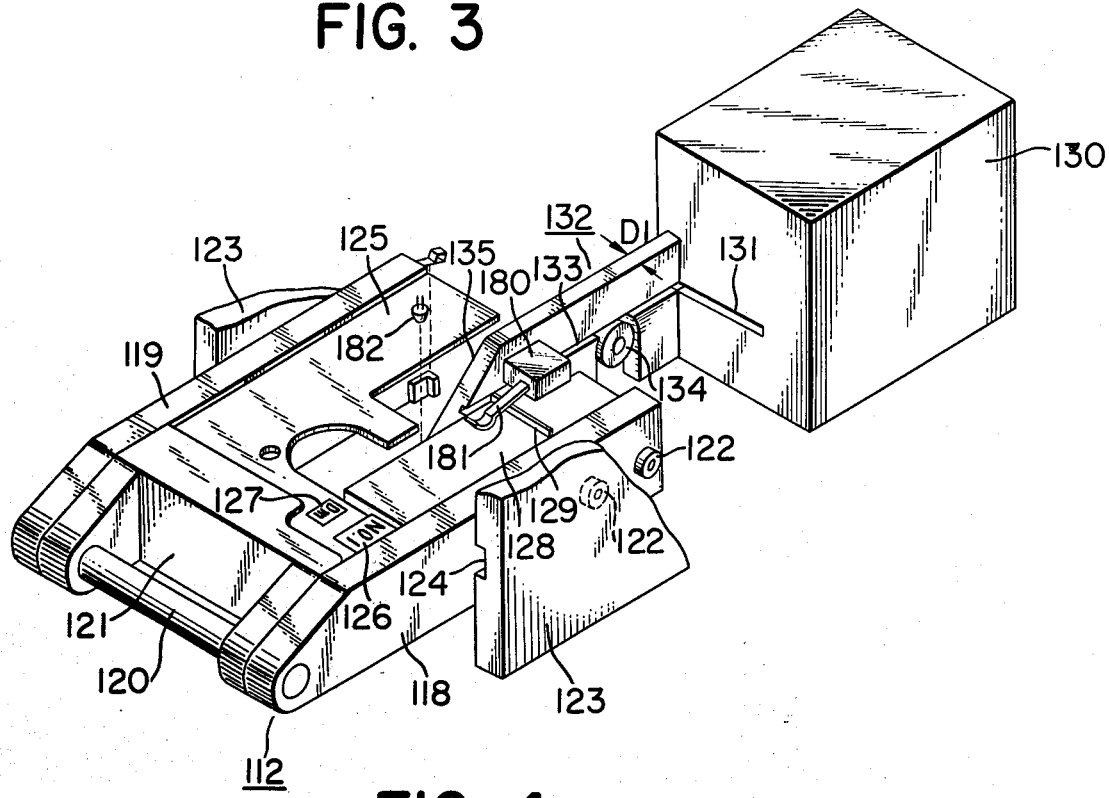

Reference will now be had to FIG. 3 to describe the tray 112 in greater detail. In this Figure, the other portion of the apparatus body 111 than that portion which directly relates to the tray 112 is removed as well as the outer housing of the apparatus body.

The tray 112 has a right side plate 118 and a left side plate 119 which are held substantially parallel to each other by structural members such as bottom and top plates of the tray. A grip 120 comprising a cylindrical pipe is secured to the fore ends of the right and left side plates 118 and 119. The grip 120 has a rotatable clip portion 121. Bearings 122 are further provided in the right and left side plates 118 and 119 (the bearing in the left side plate 119 is not seen but it is provided at a point in that side plate which corresponds to the bearing 122 in the right side plate 118), and such bearings 122 are inserted in guide grooves 124 formed on holding plates 123 secured to the apparatus body 111, whereby the tray 112 is movable back and forth within the section defined by and between the opposite holding members 123.

Such tray 112 is provided with a top plate 125 which covers not all of the top area but only a part of the tray 112 and which serves to support slips thereon.

A machine number as indicated at 126 is pre-typed in a projected form on a portion of the top plate 125, and a date as indicated at 127 is provided also in a projected form (each character of the date is prepared around a rotatable character wheel and may be set to any date by manually turning the character wheel). Such machine number and date on the top plate 125 may be recorded on a slip when the embossed characters on the card are recorded on the slip in a manner to be described, whereby the number of the machine used for the recording and the date of the recording may be left as a recorded evidence available for the future. In a cutaway portion of the top plate 125 which is adjacent to the right side plate 118, a card rest plate 128 is disposed parallel to the top plate 125 and at a level lower than the plate of the top plate 125 by an amount corresponding to the thickness of a card 115.

One end portion of the card rest plate 128 is bent to provide a restricting member 129 for restricting the movement of the card positioned to correspond to the card rest plate 128.

Behind such tray 112, there is disposed a card reader (reader means) 130 for reading magnetically recorded information from the card 115. The card reception port 131 of the card reader 130 has a guide member 132 secured thereto. The guide member 132 has a guide groove 133 for guiding one side edge (left side edge) of the card 115 to the card reception port 131, a card driving roller (transport means) 134 provided in a portion of the groove 133, and an inclined surface (separator means) 135 formed in the end portion of the guide member.

Such guide member 132 is to enter the clearance between the top plate 125 and the card rest plate 128 as will hereinafter be described, and therefore such clearance must be greater in dimension than the thickness D1 of the guide member 132.

Figure 4:
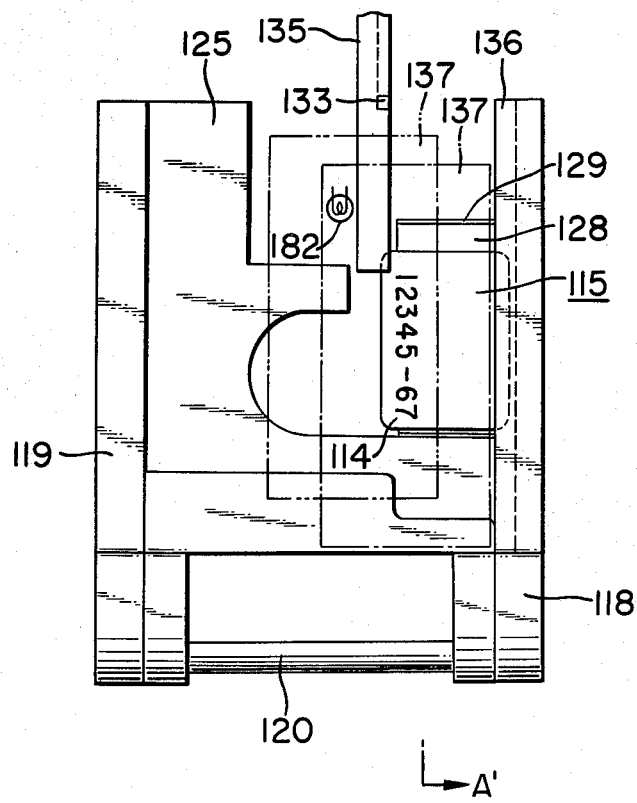

The card 115 may rest on top of the above-described tray 112 in the manner as shown in FIG. 4. It will be noted that the right side plate 118 of the tray is formed with a card guide groove 136 as indicated by dotted line. This guide groove 136 is meant to guide the right side edge of the card as it is placed on the card rest plate 128 when in the position as shown in FIG. 3, and it is to be understood that such guide groove 136 is identical in shape and parallel to the aforementioned guide groove 133.

On the card 115 when disposed in the manner as described and with the right end thereof inserted in the guide groove 136, a slip 137 larger in size than the card is further placed in such a manner that, as viewed in FIG. 4, at least a part thereof overlaps the embossed characters 114 on the card 115 as indicated by dot-and-dash line, and such slip 137 may be fixed to a desired position on the top plate 125 by means of a clip 121.

Now, placement of the above-described card and slip onto the tray is carried out with the tray 112 being drawn to its outermost position from the apparatus body 111, and by such tray being pushed toward the apparatus body, the card rest plate 128 is pivoted to thereby retract the restricting member 129 from the path of the card.

Figure 5A:
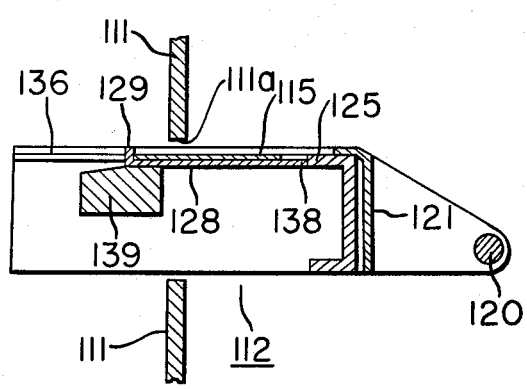
Figure 5B:
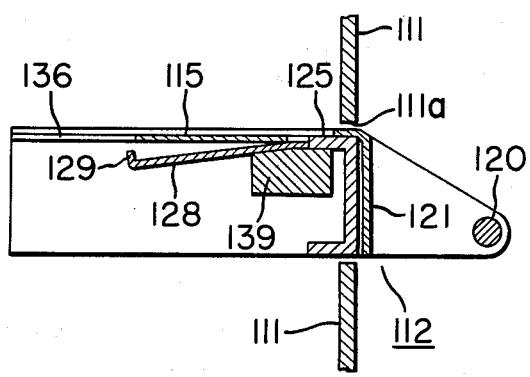
Figure 5C:
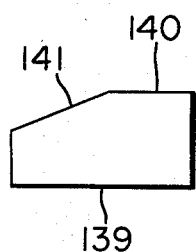

More specifically, as shown in FIG. 5, the card rest plate 128 is pivotally connected to the top plate 125 by a hinge 138, and a base portion 139 (displace means) is secured to the apparatus body 111 under the card rest plate 128. This base portion 139 has a horizontal portion 140 and an inclined portion 141, as shown in FIG. 5C, the horizontal portion 140 being at such a level that when this horizontal portion lies in contact with the back or lower surface of the card rest plate 128 the right end of the card on the card rest plate 128 is flush with the guide groove. Accordingly, in the position of FIG. 5A wherein the tray 112 has been drawn from the opening 111a of the apparatus body 111, the card 115 on the card rest plate 128 is restricted against movement by the restricting member 129, but in the position of FIG. 5B wherein the tray 112 has been pushed into the apparatus body so that the horizontal portion 140 comes to lie beneath the top plate 125 with the inclined portion 141 lying beneath the card rest plate 128, the card rest plate 126 pivots about the hinge 138 from gravity to retract the restricting member 129 from the path of movement of the card and thus, in the position as shown in FIG. 5B, the card is freely movable along the guide groove 136.

Figure 6C:
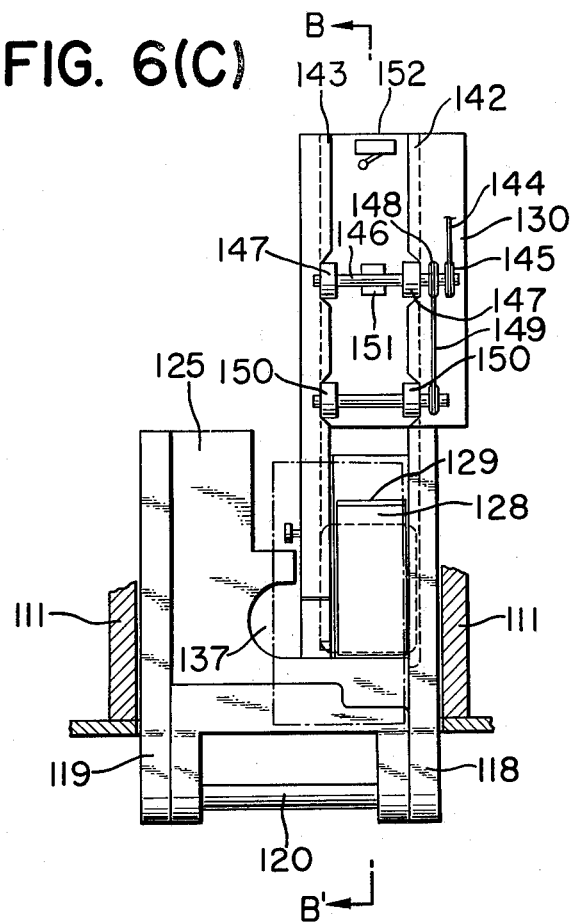

Reference will now be had to FIG. 6 to describe the movement of the card in greater detail. The card 115 is placed onto the card rest plate 128 with the tray 112 drawn from the apparatus body 111, as shown in FIG. 6A. The right end of the card 115 is then inserted in the guide groove 136 of the right side plate 118. Actually, the slip 137 is further placed on the card as indicated by dotted line, but for simplicity of description, only the movement of the card will be discussed herein. By the tray 112 being pushed in the direction of arrow R after the card 115 has been so placed, the left end of the card 115 is made to oppose the opening of the guide groove 133 in the inclined surface 135 of the guide member 132, as seen in FIG. 6B, and by the tray being further pushed in, the card 115 is introduced into the guide groove 133 (FIG. 6C).

It is to be understood that the tray 112 is moved in parallelism to the right and left side plates 118 and 119. When the tray 112 has been fully pushed into the apparatus body 111, there is brought about the position as shown in FIG. 6C, wherein the right and left side edges of the card are received in the guide grooves 133 and 136 which are connected to the card reader 130. The card reader 130 has guide grooves 142 and 143 similar to the aforementioned guide grooves 133 and 136, and these guide grooves 142 and 143 in turn have card transport rollers 147 securely mounted on the rotatable shaft 146 of a pulley 145 having a belt 144 wound thereon and rollers 150 driven by a belt 149 wound on a pulley 148 and connected to said rotatable shaft 146, whereby after being transported to the card reception port 131, the card 115 is introduced into the card reader by the rollers 150 and 147 so that the magnetically recorded information in the information zone 113 is read by a magnetic head 151. Thereafter, the card 115 is further transported into contact with a microswitch 152, whereby the rotation of an unshown motor is reversed to reverse the rotation of the rollers 147 and 150, thereby transporting the card in the opposite direction for discharge through the card reception port 131. Now assuming that the tray 112 has been pushed in as shown in FIG. 6C, the end of the card 115 is brought into contact with the driving roller 134 (FIG. 3), which is thus rotated clockwise in FIG. 3 to thereby transport the card 115 toward the card reception port of the card reader 130.

By making such a design that the card 115 contacts the rollers 150 before it is separated from the driving roller 134, the card on the card rest plate 128 may be transported into the card reader 130.

When introduced into the card reader, the card 115 has the magnetically recorded information thereon read by the magnetic head 151 and then actuates the microswitch 152, the output of which rotatably drives the rollers 147, 150 and driving roller 134 now in the opposite direction, so that the card 115 is moved in the opposite direction along the guide grooves 133 and 136 and onto the card rest plate 128.

Thus, in such position, if one tries to draw the tray 112, the tray will be somewhat drawn as already described in connection with FIG. 5, whereby the card rest plate 128 is raised to assume its horizontal position so that the tray may be further drawn to thereby cause the restricting member 129 to catch the card 115 at one end thereof and draw out the card.

Figure 7A:
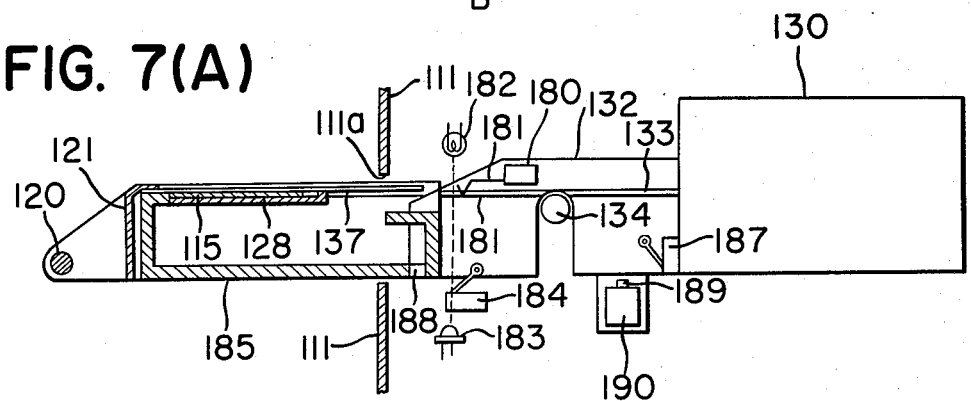
Figure 7B:
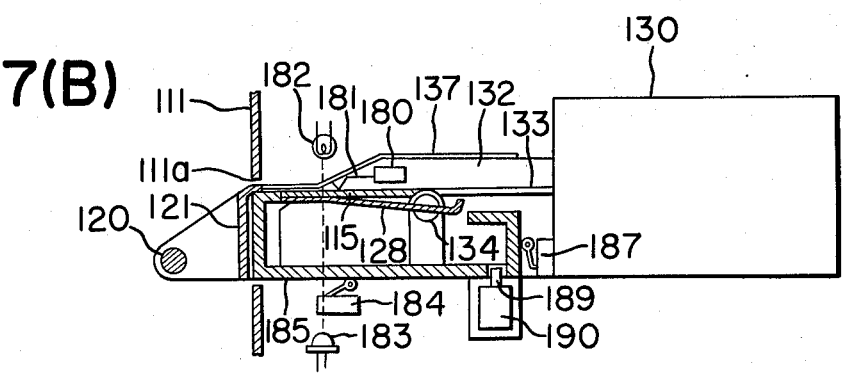
Figure 8:
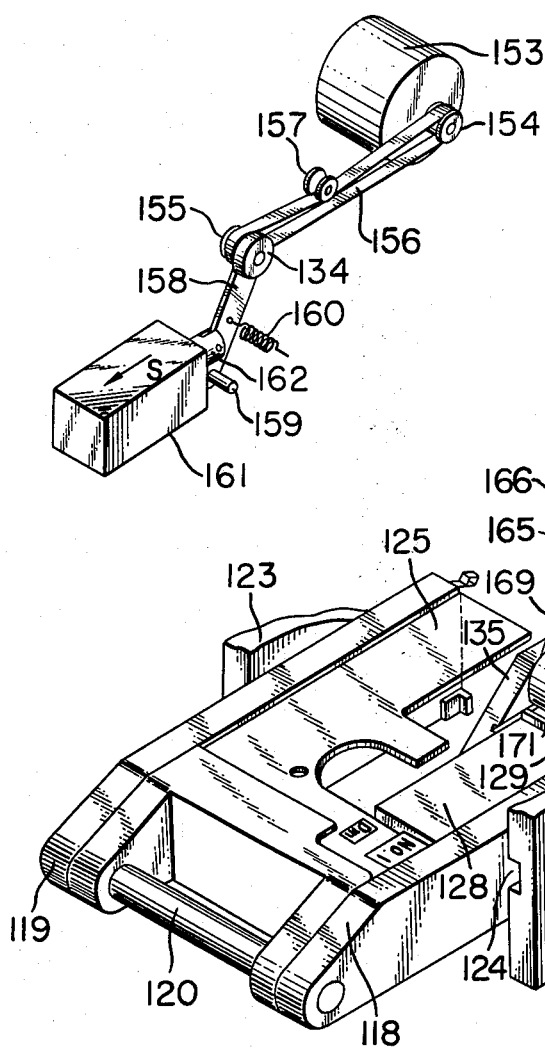

While description has been made only of the movement of the card 115 between the tray 112 and the card reader 130, actually the card 115 and the slip 137 are placed on the drawn tray 112 as shown in FIG. 4. After the card 115 and the slip 137 have been so superposed upon each other as shown in FIG. 7A and if the tray 112 is pushed into the apparatus body 111, the end of the slip 137 rides onto the inclined surface 135 of the guide member 132 as the tray is pushed in, and the slip 137 rides onto the upper end of the guide member 132 as the tray is further pushed in and simultaneously therewith, the card 115 enters the guide groove 133 on the guide member 132, and as the tray is further pushed in, the guide grooves 133 and 136 form a card transport path leading to the card reader 130, as shown in FIG. 6C. In such position, the slip 137 and the card 115 are completely separated from each other as seen in FIG. 7B, so that the card 115 alone can be transported to the card reader 130 in the manner as already described. In such position, the transport of the card 115 to the card reader 130 is accomplished by the driving roller 134 as already noted, and this driving roller 134 is rotatively driven from a motor 153 (FIG. 8), secured to a portion of the apparatus body 111, through a belt 156 extending between and wrapped around the pulley 154 securely mounted on the rotary shaft of the motor 153 and the pulley 155 connected to the driving roller 134 (the belt 156 is under a suitable tension imparted by a tension roller). On the other hand, the pulley 155 and the driving roller 134 are rotatably supported by an arm 158, the lower end of which is pivotably held by a hinge 159 and downwardly biased by a tension spring 160. Further, the arm 158 has the plunger 162 of a solenoid 161 secured to a portion thereof.

The solenoid 161, when energized, serves to drive the plunger 162 in the direction of arrow S and during energization of the solenoid 161, the driving roller 134 is raised upwardly and during the other times, the driving roller 134 is in its lower position.

Therefore, the apparatus shown in FIG. 3 is designed such that only when transport of the card is desired, the solenoid 161 is energized to bring the driving roller 134 into the guide groove 133 and during the other times, the driving roller 134 is retracted from the guide groove 133.

Figure 9A:
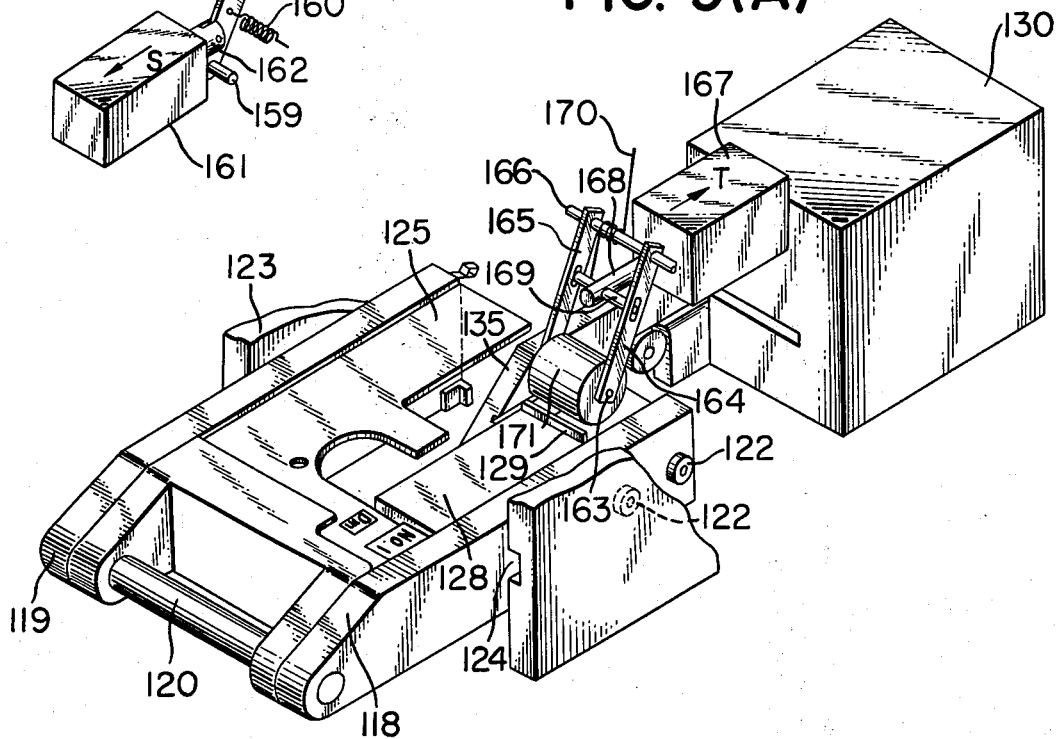

In the description hitherto, no disclosure has been made of an ink roller for simplicity of description, whereas in the apparatus now under discussion, an ink roller 171 is disposed above the card rest plate 128 with the rotatable center shaft 163 thereof rotatably held by two arms 164 and 165 and the other ends of the arms 164 and 165 are pivotally secured to a hinge 166 secured to the unshown housing 111 (FIG. 9).

A solenoid 167 is secured to another portion of the unshown housing and the end of a plunger 168 energizable by the solenoid 167 is secured to a driver 169 provided between the arms 164 and 165. On the hinge 166, there is provided a spring 170 for biasing the arms 164 and 165 clockwise, so that when the solenoid 167 is not energized, the ink roller 171 is lifted by the force of the spring 170 (because the arms are rotated clockwise) to thereby disengage the ink roller 171 from the card rest plate 128 as indicated by dotted lines in FIG. 9B and that when the solenoid 167 is energized, the arms are rotated counter-clockwise to lower the ink roller 171 so as to be urged against the card rest plate 128, as indicated by solid lines in FIG. 9B.

Figure 9B:
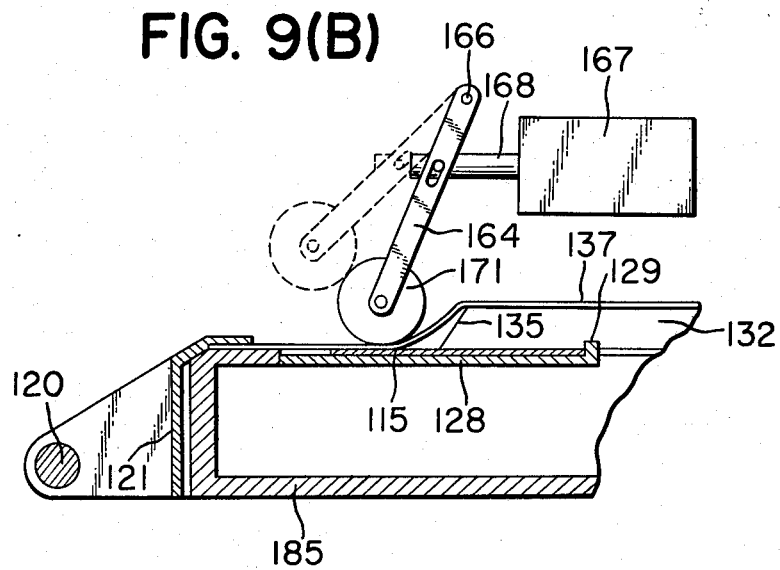

The ink roller 171, as shown in FIG. 9B, is so arranged as to be urged against the card rest plate 128 in the portion thereof which is more adjacent to the grip of the tray 112 than the inclined surface 135 of the guide member 132, when viewed from the right side of the roller, and such ink roller 171 may be of the type which is used with conventional imprinters.

In the apparatus described above, the card 115 and the slip 137 are placed on the tray 112 in superposed relationship with each other as already noted, and the tray 112 is drawn from the apparatus with the ink roller 171 being urged against the card and slip, whereby the card and slip are moved to record embossed characters onto the slip 137. On the tray, the card 115 is restricted against movement by the restricting member 129 but would be moved if it were left simply in such state, and therefore the present apparatus is provided with a clip (restraining means) for restraining the slip 137 on the tray.

FIG. 10 shows such a clip. The grip 120 provided between the opposite side plates 118 and 119 of the tray is further provided with a right side plate 172 and a left side plate 173 pivotally mounted on the grip 120 and disposed inwardly of the right side plate 118 and the left side plate 119. These additional side plates are connected together by a front plate 174, and a keep plate 175 is formed in the portion of the tray which is contiguous with the front plate 174 and complements the top plate 125.

Figure 10A:
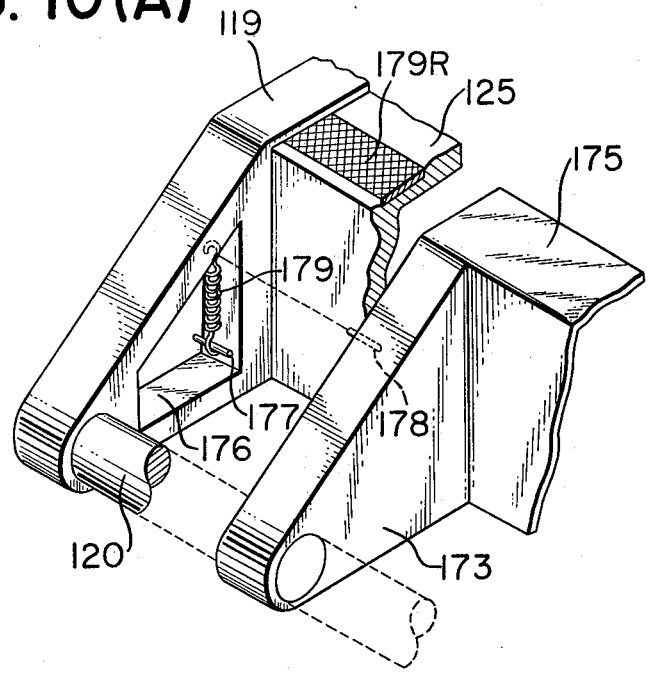
Figure 10B:
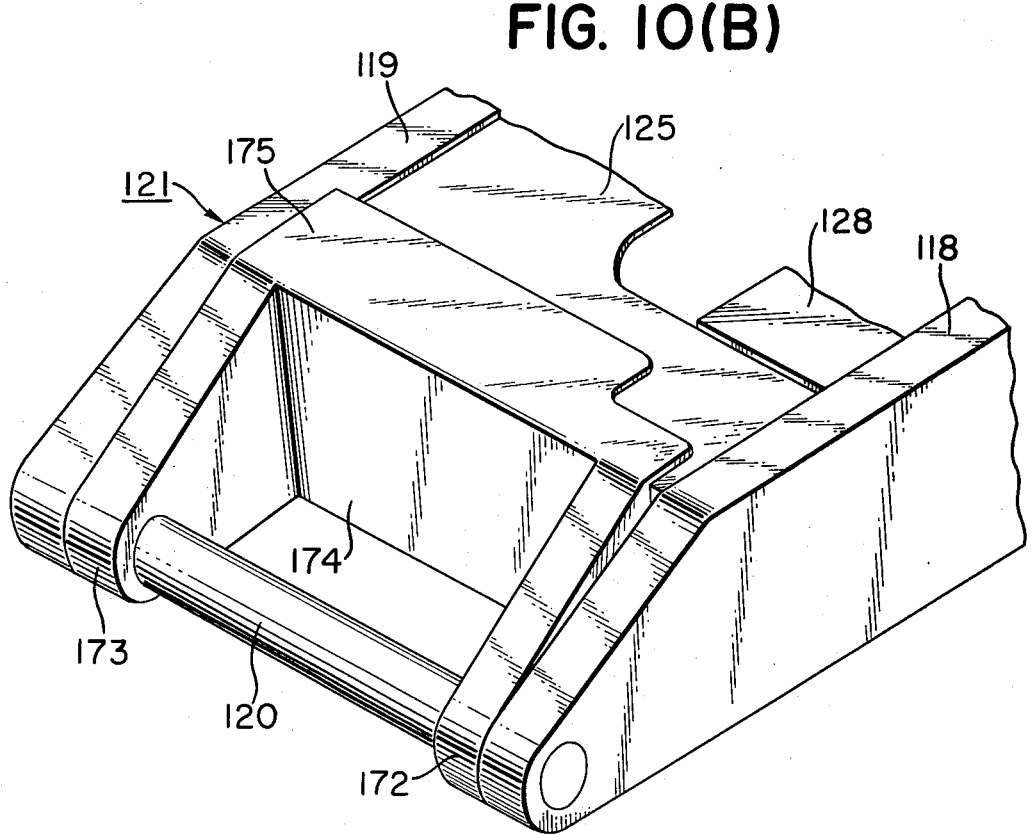

The clip 121 so formed is designed so as to be somewhat pivotable about the grip 120, as seen in FIG. 10B. The left side plate 119, as shown in FIG. 10A, has a recess 176 formed in a part thereof, and a pin 177 is studded in a portion of the recess 176 (the length of the pin 177 is such that it is not projected beyond the recess 176), and a pin 178 is studded in that portion of the left side plate 173 which corresponds to the recess (the length of the pin 178 is shorter than the depth of the recess). A tension spring 179 is stretched between and secured to the two pins 177 and 178.

Thus, the keep plate 175 is normally biased by the spring 179 in a direction to be urged against the top plate 125. Therefore, as shown in FIG. 10B, by manually raising either the right side plate 172 or the left side plate 173 to provide a clearance between the keep plate 175 and the top plate 125 and by inserting a slip into the clearance and then releasing the side plate, the slip may be pinched by and between the keep plate 175 and the top plate 125 with the aid of the force of the spring 179. In order to ensure the slip to be more reliably pinched, a rubber plate 179R may be embedded within a part of the top plate 125, as shown in FIG. 10A.

The tray and its surrounding parts are constructed as generally described above, but such apparatus is controlled in various modes depending on the position and other conditions of the tray and electric control of the apparatus will further be described by reference to the control circuit diagram of FIG. 11 and other figures of the drawings. A first detector unit (card detecting means) provided for effecting such control is a microswitch 180 secured to a portion of the guide member 132 as shown in FIGS. 3 and 7 (the microswitch is shown to be located at the position indicated at 180 in FIG. 7, but actually it is located at a somewhat different position whereat it does not contact the ink roller 171, as will hereinafter be described), and this microswitch serves to detect the presence of the card 115 on the card rest plate 128. As will be seen in FIG. 7, the microswitch 180 does not produce its output at all times if the card 115 is only placed on the card rest plate, but it is switched on to provide its output only when the tray 112 is pushed into a certain extent until the detection element 181 of the switch 180 comes into contact with the card 115.

A second detector unit (paper leaf detecting means), as is shown in FIGS. 3 and 7, comprises a lamp 182 provided at a part of the apparatus body 111 and a photoelectric converter 183 for sensing the light from the lamp 182 to produce an output. Such lamp and photoelectric converter serve to detect the presence of the slip 137 on the top plate 125 at least when the tray is in its withdrawn position and for example, they may preferably be situated at the positions indicated in FIGS. 3 and 4. (In FIG. 4, it should be understood that the photoelectric converter 183 lies on a line perpendicular to the plane of the drawing and with the slip 137 interposed between the lamp 182 and the photoelectric converter). By such an arrangement, it is made possible in the withdrawn position of the tray 112 that when there is a slip on the top plate, the light from the lamp 182 is intercepted by the slip and no output is produced by the photoelectric converter 183 and that when there is no slip on the top plate, the light from the lamp 182 reaches the photoelectric converter 183 to cause the latter to produce its output.

A third detector unit comprises a microswitch 184 which has a detection element 186 secured to a portion of the apparatus body 111 so as to be in contact with the bottom surface 185 of the tray 112 and which is designed to be opened when the tray 112 is in its drawn position as shown in FIG. 7A and to be closed and put out a high level signal when the tray is in its withdrawn position as shown in FIG. 7B.

A further detector unit (first position detecting means) comprises a microswitch 187 which is designed to be closed and put out a high level signal when the tray 112 is in its fully withdrawn position as shown in FIG. 7B and to put out a zero level signal during the other times.

The bottom surface 185 of the tray 112 will further be described. The bottom surface 185 has an aperture formed through a portion thereof, and a plunger 189 is provided at a location which corresponds to the aperture 188 (FIG. 7A) when the tray 112 has been fully withdrawn as shown in FIG. 7B. The plunger 189 may be driven by a solenoid 190 secured to the apparatus body. Thus, when the solenoid 190 is energized, the plunger 189 may be inserted into the aperture 188 to lock the tray 112, as shown in FIG. 7B, and when the solenoid 190 is deenergized, the tray 112 may be free to move.

Reference will now be had to FIG. 11 to describe in greater detail. The output of the switch 180 detecting the card 115 is applied to the set input of a flip-flop 191, whose set output is in turn applied to AND gates 192 and 193; the output of the photoelectric converter 183 is inverted by an inverter 194 and then applied to the set input of a flip-flop 195, whose set output is applied to the AND gates 192 and 193; the output of the switch 187 is applied to the AND gate 193; and the output of the switch 184 is applied as reset signal to the flip-flops 191 and 195 and also to the AND gate 192.

Also applied to the AND gate 192 is an identification coincidence signal which comprises a high level signal produced when the invisible identification number on the card and the invisible identification number entered from the keyboard are compared and coincident with each other (a zero level signal is produced when the two invisible identification numbers are not coincident), and the output of the AND gate 192 is applied to a driving circuit 196, whose output drives the solenoid 167 for energizing the ink roller 171.

The output of the AND gate 193 is applied to AND gates 197 and 198, to which are also applied a processing finish signal which represents the finish of all the card processings requiring the card itself, such as reading of the information on the card by the card reader 130, writing of such information into the card if required, etc. (this signal assumes its high level upon finish of the processings and assumes its low level during continuance of the processings and the signal applied to the AND gate 197 is inverted).

The output of the AND gate 197 is applied as input to a flip-flop 199, whose output is in turn applied as the reset input to a flip-flop 199, whose set output is applied to a driving circuit 200, whose output drives the solenoid 190.

It should be noted that the above-mentioned processing finish signal may be formed by an OR output of the identification coincidence and non-coincidence signals provided as the result of the check-up and invalidity signal representing the invalidity of the card and an AND output of these signals and the card presence signal representing the presence of the card on the card rest plate 128.

The construction of the apparatus has generally been described above, and will further be explained in accordance with the sequence in which the apparatus is actually used.

When such apparatus is to be used, an unshown key is inserted into a power source key switch 201 to connect all the power sources and confirm the connection of the power sources by means of a lamp 202 (FIG. 1).

Under such condition, no card 115 or no slip is present in the tray, of course, and the solenoids 167 and 190 remain deenergized and accordingly, the tray 112 remains unlocked while the ink roller 171 is out of engagement with the card rest plate 128. In this state, the tray 112 is drawn by manually grasping the grip 120 and the card 115 is placed onto the card rest plate 128, whereafter the right side edge of the card 115 is inserted into the guide groove 136 of the right side plate 118, as shown in FIG. 4. It is to be noted that the card 115 so placed is in a position wherein the projections of the embossed characters 114 thereon face upwardly.

Thereafter, a clearance is provided between the top plate 125 and the keep plate 175 by normally raising the right 172 or the left side plate 173 in the manner as shown in FIG. 10B, and then the leading end of the slip 137 is inserted into said clearance so that at least a part of the slip 137 overlaps the embossed characters on the card, whereafter the grasped side plate is released, whereupon the slip 137 is securely urged against the top plate 125 by the keep plate 175 with the aid of the force of the spring 179.

Thereafter, the tray 112 is pushed into the apparatus body 111, whereby the slip 137 is caused to ride onto the guide member 132 and separated from the card 115, as shown in FIG. 7, and as the tray is further pushed in, the guide grooves 136 and 134 are rectilinearly connected together, whereby a pair of card guide paths are formed by the guide grooves 136 and 133 between the card rest plate 128 and the card reader 130. In such a state, the card rest plate 128 is in its downwardly pivoted position about the hinge 138 as shown in FIG. 5, so that the restricting member 129 on the card rest plate 128 is retracted from the card guide paths.

In such position, there are outputs produced by the switches 180 and 187 and the photoelectric converter 183, so that the solenoid 190 is energized to insert the plunger 189 into the aperture 188, thereby locking the tray 112 with respect to the apparatus body 111.

In this manner, the presence of the card and the full pushing-in of the tray is detected and the motor 153 is driven in the forward direction (the direction to introduce the card into the card reader) while, at the same time, the solenoid 161 is energized to move the plunger 162 in the direction of arrow S and an unshown motor for driving the rollers 147 and 150 of the card reader is also driven in the forward direction. In such fully pushed-in position of the tray 112, the driving roller 134 is urged into contact with the card 115 which then lies in the guide groove 133, so that the card 115 is transported along the guide paths formed by the guide grooves 133 and 136 and toward the card reader 130. When the leading end of the card 115 reaches the roller 150, the card 115 is transported by such roller in addition, and as it is further moved, the card 115 is disengaged from the driving roller 134 and further transported into the card reader 130. During such transport of the card, the data magnetically recorded in the information zone (including the validity and invalidity signals and the invisible identification number) is read by the magnetic head 151 and the validity or the invalidity of the card is memorized and displayed by a lamp 204 or 205 (FIG. 1) while, at the same time, parity check or the like is effected to memorize whether the data reading has been done normally or not (error) and if the result of the check is "error", such result is displayed by a lamp 206.

The information is so read and when the leading end edge of the card 115 actuates the microswitch 152, the signal from this microswitch is applied to invert an unshown flipflop for controlling the direction of rotation of an unshown motor and of the motor 153, thereby reversing the direction of rotation of these motors. Below the roller 147, unshown detector means is provided to detect the passage of the card 115 and when such detector means detects the passage of the trailing end of the card, and if the result of the parity check "error" is preserved, the aforesaid flip-flop is again inverted to drive the motors in the forward direction to cause the information on the card 115 to be re-read repetitively. When this occurs, the parity check is of course taking place and such re-reading of the information is effected a predetermined number of times (say, three times). When the information has been normally read from the card 115 or when the invalidity of the card is memorized, the card 115 is intactly discharged from the card reader 130 and transported back by the driving roller 134 along the guide paths formed by the guide grooves 133 and 136, and the arrival of the card 115 at a position corresponding to the card rest plate 128 is detected by the switch 180, whereupon the unshown motor driving the rollers 150, 147 and the motor 153 are stopped from rotating while, at the same time, the solenoid 161 is deenergized.

In this manner, the return of the card 115 from the card reader 130 is detected and (as by the use of the output of the switch 180), a display "ENTER YOUR INVISIBLE IDENTIFICATION NUMBER" appears in the display window 203 of the keyboard 117 connected to the apparatus body 111 by the cord 116, thus instructing the bearer of the card to enter his invisible identification number from the keyboard 117 (FIG. 1). The invisible identification number so entered is compared with the invisible identification number read from the aforementioned card and if the two are coincident with each other, a coincidence signal is produced and if not so, a non-coincidence signal is produced.

As will be apparent from FIG. 11, as soon as such coincidence signal is produced, the solenoid 167 is energized to lower the ink roller 171 to the position as indicated by solid lines in FIG. 9B, thereby pressing the slip 137 to the card 115. Simultaneously therewith, the flip-flop 199 is reset so that the solenoid 170 is deenergized and the plunger 189 so far inserted in the aperture 188 is drawn therefrom, thereby unlocking the tray 112 with respect to the apparatus body.

In contrast, if the invisible identification number entered and the invisible identification number read are not coincident with each other, the solenoid 167 will remain unenergized so that the ink roller 171 is not lowered, but since the processing finish signal in FIG. 11 comprises the OR output of the error signal, coincidence signal and non-coincidence signal and the AND output of these signals and the signal from the switch 180, the tray 112 may be unlocked by the coincidence signal, the non-coincidence signal or the error signal being produced.

When the check is so finished, such finish is displayed by a lamp 208 or 209 and the processing finish signal is produced, whereupon the lamp 207 is turned on to report that the processing has been finished. The turn-on of such processing finish display lamp is confirmed and then the tray 112 is drawn from the apparatus body, whereupon the card rest plate 128 in the position as shown in FIG. 5B is pivoted about the hinge 138 to assume a horizontal position in response to the drawing movement of the tray and thereby permit the restricting member 129 to come into the card guide path and arrest the card 115. The tray in such position is further drawn to thereby cause the embossed characters on the card to be urged against the slip by the ink roller, so that all the characters on the card are recorded on the slip as the card and slip are moved with the tray by the clip 121 and the restricting member 129. As the tray 112 is further drawn, the switch 184 is opened to deenergize the solenoid 167 and thereby permit the ink roller 171 to be displaced to the position as indicated by dotted lines in FIG. 9B.

Since the signal produced upon opening of the switch 184 is supplied as clear signal to all of the flip-flops and other memory devices used in the present apparatus, all of these are reset to their initial conditions when the tray is so drawn out. Thus, the imprinted slip and the card may be removed from the tray to thereby render the apparatus ready for another use.

Description will now be made of a second embodiment of the displace means in the card processing apparatus of the present invention. The card tray 212 shown in FIG. 12 differs slightly in shape from the card tray of the first embodiment and does not essentially differ from the latter. The card tray 212 has a right side plate 214 and a left side plate 115, and the lower end of the right side plate 214 is formed with a groove 216 having a width corresponding to the thickness of the card 115 so that the card 115 may be guided along the groove 216 so as to escape to the rear of the card tray 212. Also, the front bottom portion of the tray is provided with a step 217 for regulating the card receiving position so that the card 115 partly inserted in the groove 216 can be positioned only inwardly of the rear end of the step 217. A card rest 218 is disposed in a portion corresponding to the bottom of the tray 212 and is connected to the rear end of the step 217 by unshown hinge means, and a clearance is provided between that side edge of the card rest 218 which is opposed to the aforementioned right side plate 214 and projections 219 defining the groove 216. A further clearance for receiving therein rollers 227 and 228 as will later be described is provided between the card rest 218 and the left bottom plate 226. Thus, the card rest 218 is pivotable about its hinge.

The top surface of such card rest 218 is secured by said hinge so as to permit one side edge of the card 115, when placed thereon, to slide into the groove 218 (such position will hereinafter be referred to as the horizontal position), and the rear end of the card rest is bent into L-shape so as to provide a restricting portion 220 for preventing the card 115 from moving rearwardly from the card rest 218.

Figure 12:
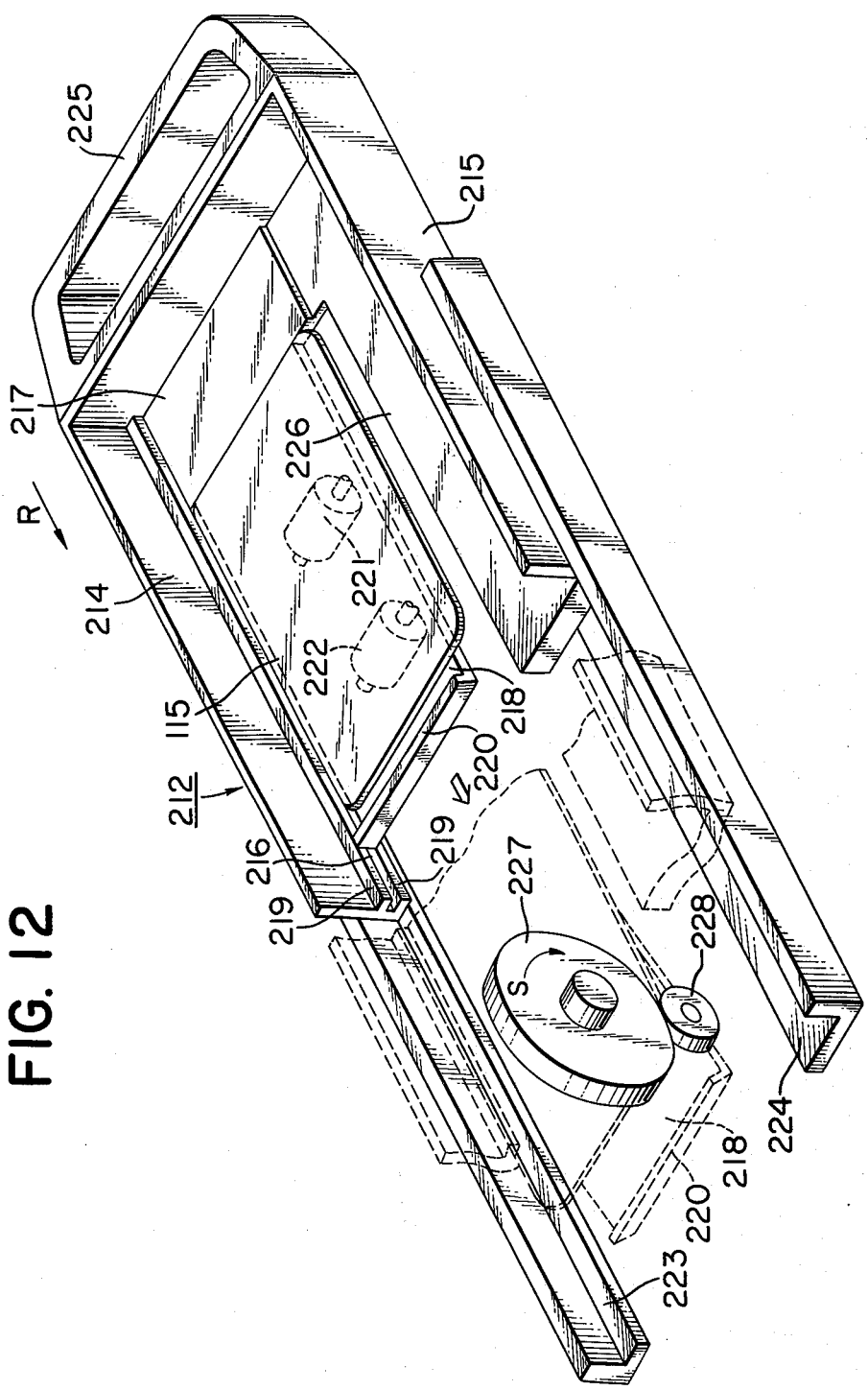

More specifically, in the position as indicated by solid lines in FIG. 12, the card 115 has its axial movement in the card tray restricted by the step 217 and the restricting portion 220. As already noted, the card rest 218 is pivotable by means of the hinge, and two rotatable rollers 221 and 222 to be described in detail (such rollers are secured to the main body of the card processing apparatus and from the aforementioned displace means) are disposed below the card rest 218 to maintain the card rest horizontal.

Rails 223 and 224 are disposed at the positions opposed to the right 214 and the left side plate 215 of the card tray 212 and such rails are secured to the apparatus body, whereby the above-described card tray 212 is slidable on the rails 223 and 224 or may be drawn into and out of the apparatus body. Additionally remarking, the card tray depicted by solid lines in FIG. 12 is shown as having been drawn from the opening portion (210a in FIG. 13 or 211a in FIG. 14) of the apparatus body.

Thus, by manually gripping a handle 225 secured to the card tray 212 and pushing the tray in the direction of arrow R, the tray may be brought into the position as indicated by dotted lines, whereafter the card rest 218 will be downwardly pivoted about the hinge by an operation as will hereinafter by described, so that the restricting portion 220 will be displaced downwardly of the plane containing the card 115. Rollers 227 and 228 are disposed in a portion of the apparatus body (housing) 210 for nipping therebetween that end of the card 115 on the tray 212 which protrudes beyond the card rest when the card tray 212 is pushed in. The roller 227 is driven for rotation in the direction of arrow S by an unshown motor so that the card 115 may be driven within the card tray along the groove 216 in the direction of arrow R.

Therefore, by disposing a conventional card reader behind the rollers 227 and 228, it is possible to make the card reader read the information recorded on the card 115. After such reading has been finished, the roller 227 may be driven for rotation in the opposite direction to the arrow S to thereby return the card to the position as indicated by dotted lines, whereafter the handle 225 may be pulled on to draw the card tray 212 from the apparatus body, whereby the card rest 218 may be brought to its horizontal position by the roller 221 while the card 115 is drawn with the tray by the restriction imparted from the restricting portion 220, thus bringing about the position as indicated by solid lines in FIG. 12 (exactly, a position in which the card 115 is in contact with the restricting portion 220).

Reference will now be had to FIG. 13 to describe the movement (pivotal movement) of the card rest 218 and the restricting portion 220 provided therein which takes place in accordance with the position of the card tray.

Figure 2:
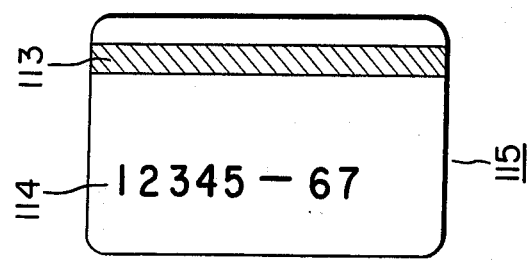
Figure 13A:
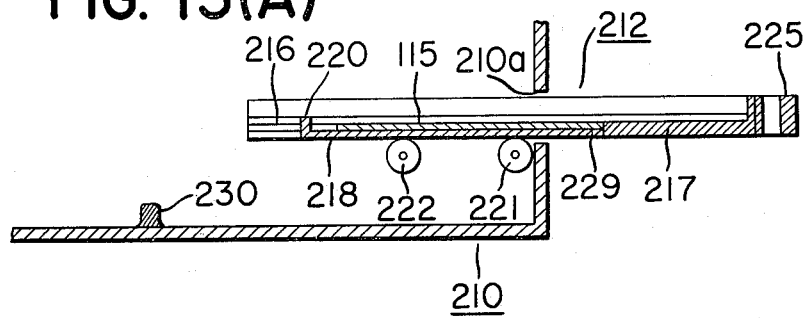
Figure 13B:
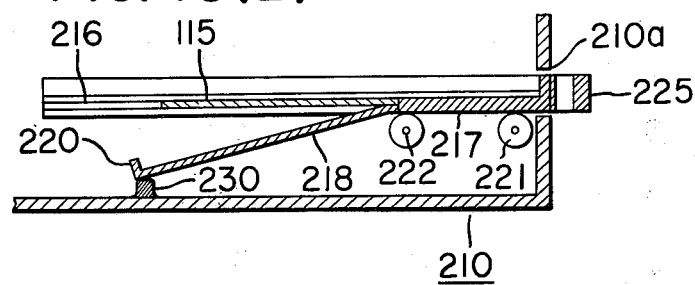
Figure 13C:
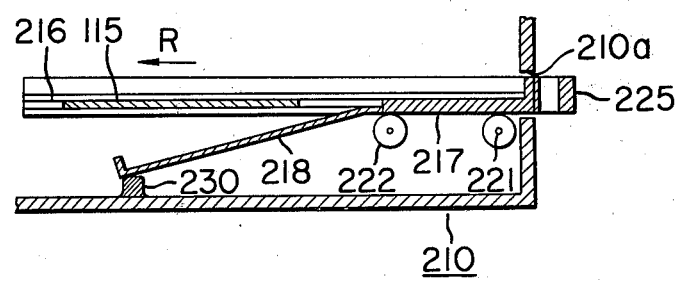

It has already been noted that the rotatable rollers 221 and 222 are disposed below the card rest 218 secured to the step 217 by the hinge 229. The roller 222 is arranged so that it comes to underlie the card rest 218 when the card tray 212 is drawn from the apparatus body and that it comes to underlie the step 217 when the card rest 212 is withdrawn into the apparatus body (the roller 221 acts in no way in response to the pivotal movement of the card rest 218). With such an arrangement, the card rest 218 may be raised into its horizontal position by the rollers 221 and 222 when the card tray 212 is drawn from the apparatus body 210, as shown in FIG. 13A, but the roller 222 disposed below the card rest 218 may come to underlie the step 217 when the card tray 212 is pushed into the apparatus body 210, as shown in FIG. 13B, so that the support which has so far supported the card rest 218 from therebelow is lost to permit the card rest 218 to pivot about the hinge 229 from gravity until it is stopped by a stop 230 provided at the bottom of the apparatus body 210. In such position, the restricting portion 220 is no longer blocking the path of movement of the card 115 and, as shown in FIG. 13C, the card 115 may be transported in the direction of arrow R by the rollers 227 and 228 shown in FIG. 2. When so transported and processed by the card reader, not shown, the card is returned into the card tray 212 upon finish of the processing and assumes the position as shown in FIG. 13B; therefore, by the card tray 212 being drawn out, the roller 222 causes the card rest 218 to pivot upwardly about the hinge 229 so that the restricting portion 220 comes to restrict the card as the card tray is drawn out with the card resting on the card rest 218.

Description will now be made of a third embodiment of the displace means in the card processing apparatus of the present invention. FIG. 14 shows a further embodiment of the means for pivotally moving the card rest. In this embodiment, unlike the embodiment of FIG. 13, the position of the card tray 212 is electrically detected and the resulting detection signal is used to control a solenoid and accordingly, the card rest. More specifically, a solenoid 232 is secured to a portion of the apparatus body (housing) 211 and a base 233 is secured to another portion of the apparatus body; the base 233 has an arm 234 pivotally supported thereon and the arm 234 has a roller 235 rotatably supported at one end thereof. Another arm 236 is rotatably supported on a portion of the arm 234 and the other end of the arm 236 is pivotally connected to the plunger 237 of the solenoid 232.

Figure 14A:
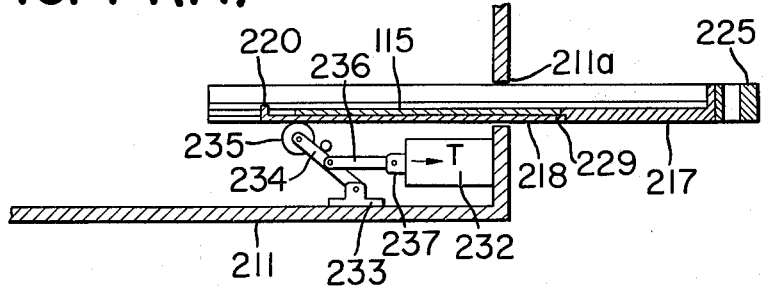
Figure 14B:
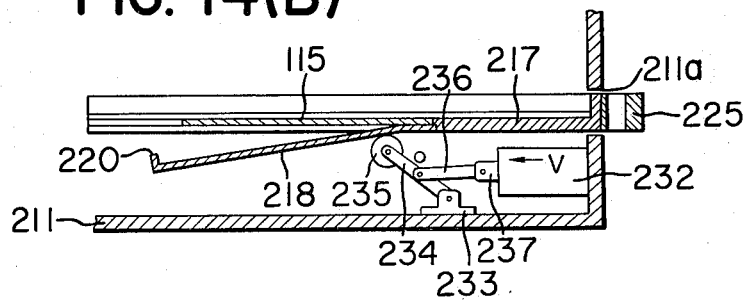

Since such plunger 237 is normally biased in the direction of arrow T by an unshown spring, the roller 235 acts to raise the bottom surface of the card tray 212 so as to bring the arm 234 into contact with a stop 238. The lengths of the base 233 and the arm 234 are selected such that the roller 235 underlies the card rest 218 whether the card tray 212 is pushed-in or drawn out. Thus, the pushingin of the card tray into the apparatus body 211 is detected by a microswitch or like means, not shown, and the solenoid 232 is thereby energized to move the plunger 237 in the direction of arrow V, whereby the card rest 218 is downwardly displaced as shown in FIG. 14B. In any other position of the card tray, the solenoid 232 remains deenergized to permit the roller 235 to be raised by the force of a spring, not shown, whereby the card rest 218 may be maintained in its horizontal position, as shown in FIG. 14A.

In FIG. 14, similar reference numerals designate similar members shown in FIG. 13.

The present invention has been described with respect to an embodiment in which the movement of the card rest 218 provided with the restricting portion 220 causes movement of the restricting portion 220, whereas the present invention is not restricted to such embodiment but it is of course possible to provide the restricting portion 220 and the card rest member separately from each other and to control the restricting member alone.

The card processing apparatus according to the present invention, as has hitherto been described, is constructed such that the tray containing a card therein is drawn from the apparatus body and therefore, by placing in advance a slip onto the card on the card tray and by designing the ink roller to be urged against the card with the slip therebetween before the tray is drawn out after a processed card is returned onto the card tray, the ink roller may be rotated as the card tray is drawn, whereby the embossed characters on the card may be transferred onto the slip.

Thus, by manually drawing out the card tray, it is possible to rotate the ink roller and this leads to simplification of the drive system or the like.

Further, the present invention is usable not only for the printing of the described type but also as a mere card insertion device for the card processing apparatus.

What is claimed is:

1. A card processing apparatus comprising:
   a housing having an opening therein;
   card carrying means movably disposed within said opening of said housing and having a card rest portion on which a card having information recorded thereon may rest;
   reader means disposed within said housing for reading the recorded information from said card;
   transport means for transporting said card on said card rest portion to said reader means by said card carrying means being moved within said opening and inwardly of said housing; and
   guide means disposed between said card carrying means and said reader means for guiding said card between said two means.

2. A card processing apparatus according to claim 1, wherein said card guide means is formed when said card carrying means is moved to a first position within said housing.

3. A card processing apparatus according to claim 2, wherein said card guide means comprises first card guide means provided on said reader means and second card guide means provided on said card carrying means.

4. A card processing apparatus according to claim 2, wherein said card carrying means is provided in a portion thereof with restricting means for restricting the movement of said card, said restricting means being operable to release its restriction upon the movement of said card when said card carrying means is moved to said first position and to restrict the movement of said card when said card carrying means is moved to a second position which is outside said housing.

5. A card processing apparatus according to claim 4, wherein said restricting means is controlled by displace means.

6. A card processing apparatus according to claim 5, wherein said displace means comprises a base portion having a horizontal portion and an inclined portion.

7. A card processing apparatus according to claim 5, wherein said displace means comprises a plurality of rollers secured within said housing.

8. A card processing apparatus according to claim 5, wherein said displace means comprises a roller movable by a plunger.

9. A card processing apparatus according to claim 3, wherein said first guide means has transport means for transporting said card.

10. A card processing apparatus according to claim 3, wherein said first and second guide means comprise a pair of card guide grooves.

11. A card processing apparatus comprising:
a housing having an opening therein;
card carrying means having a portion for carrying a card which bears information recorded thereon, said card carrying means being movable relative to said opening between a first position wherein said card carrying means is within said housing and a second position wherein at least a portion of said card carrying means is out of said housing through said opening;
reader means, located within said housing for reading the information recorded on the card;
card processing means for processing the card after the information of the card is read therefrom;
transport means for transporting said card carrying means into said housing to move said card carried on said card carrying portion to said reader means;
position detecting means for detecting whether said card carrying means is at said first position;
process detecting means for detecting whether the card has been processed by said card processing means;
a driving circuit producing an output in accordance with said position detecting means and said process detecting means; and
preventing means for preventing said card carrying means from movement in response to the output of said driving circuit.

12. An apparatus according to claim 11, further comprising card detecting means for detecting whether a card is carried on said card carrying portion of said card carrying means, wherein said driving circuit is further controlled by said card detecting means.

13. An apparatus according to claim 11, further comprising:
sheet carrying means provided on said card carrying means, said sheet carrying means having a portion for carrying a sheet;
sheet detecting means for detecting whether a sheet is carried on said sheet carrying portion of said sheet carrying means; and
card detecting means for detecting whether a card is carried on said card carrying portion of said card carrying means;
said driving circuit being further controlled by said sheet detecting means and said card detecting means.

14. A card processing apparatus comprising:
a housing having an opening therein;
card carrying means having a portion for carrying a card which bears information recorded thereon, said card carrying means being movable relative to said opening between a first position wherein said card carrying means is within said housing and a second position wherein at least a portion of said card carrying means is out of said housing through said opening;
reader means, located within said housing for reading the information recorded on the card;
card processing means for processing the card after the information of the card is read therefrom;
transport means for transporting said card carrying means into said housing to move said card carried on said card carrying portion to said reader means;
card guiding means, disposed between said card carrying means and said reader means, for guiding the card therebetween;
position detecting means for detecting whether said card carrying means is at said first position;
process detecting means for detecting whether the card has been processed by said card processing means;
a driving circuit producing an output in accordance with said position detecting means and said process detecting means; and
preventing means for preventing said card carrying means from movement in response to the output of said driving circuit.

15. An apparatus according to claim 14, further comprising card detecting means for detecting whether a card is carried on said card carrying portion of said card carrying means, wherein said driving circuit is further controlled by said card detecting means.

16. An apparatus according to claim 14, further comprising:
sheet carrying means provided on said card carrying means, said sheet carrying means having a portion for carrying a sheet;
sheet detecting means for detecting whether a sheet is carried on said sheet carrying portion of said sheet carrying means; and
card detecting means for detecting whether a card is carried on said card carrying portion of said card carrying means;
said driving circuit being further controlled by said sheet detecting means and said card detecting means.

17. A card processing apparatus comprising:
a housing having an opening therein;
card carrying means having a portion for carrying a card which bears information recorded thereon, said card carrying means being movable relative to said opening between a first position wherein said card carrying means is within said housing and a second position wherein at least a portion of said card carrying means is out of said housing through said opening;
reader means, located within said housing for reading the information recorded on the card;
card processing means for processing the card after the information of the card is read therefrom;
transport means for transporting said card carrying means into said housing to move said card carried on said card carrying portion to said reader means;
position detecting means for detecting whether said card carrying means is at said first position;
process detecting means for detecting whether the card has been processed by said card processing means;
preventing means for preventing said card carrying means from movement in accordance with said position detecting means and said process detecting means;

sheet carrying means provided on said card carrying means and having sheet carrying portion for carrying a sheet; and recording means for recording on the sheet carried on the sheet carrying portion of said sheet carrying means.

18. An apparatus according to claim 17, wherein said card processing means comprises:

information input means for applying information to be compared with the information read out of the card by said reader means; and comparison means for comparing the information read out of said card and the information applied by said information input means;

said recording means being driven by an output of said comparison means.

19. An apparatus according to claim 18, wherein said sheet carrying means is so arranged that the sheet and the card may be placed in a superposed relationship, and said recording means includes urging means for press-contacting the sheet and the card to record embossed characters of the card onto the sheet.

20. An apparatus according to claim 19, wherein said urging means includes a roller.

21. An apparatus according to claim 17, wherein said sheet carrying means is provided with locking means for preventing movement of the sheet relative thereto, said locking means being movable to allow the sheet to be moved on the sheet carrying portion, when said card carrying means is placed at the second position thereof.

22. A card processing apparatus comprising:

a housing having an opening therein;

card carrying means having a portion for carrying a card which bears information recorded thereon, said card carrying means being movable relative to said opening between a first position wherein said card carrying means is within said housing and a second position wherein at least a portion of said card carrying means is out of said housing through said opening;

reader means, located within said housing for reading the information recorded on the card;

card processing means for processing the card after the information of the card is read therefrom;

transport means for transporting said card carrying means into said housing to move said card carried on said card carrying portion to said reader means;

card guiding means, disposed between said card carrying means and said reader means, for guiding the card therebetween;

position detecting means for detecting whether said card carrying means is at said first position;

process detecting means for detecting whether the card has been processed by said card processing means;

preventing means for preventing said card carrying means from movement in accordance with said position detecting means and said process detecting means;

sheet carrying means provided on said card carrying means and having sheet carrying portion for carrying a sheet; and recording means for recording on the sheet carried on the sheet carrying portion of said sheet carrying means.

23. An apparatus according to claim 22, wherein said card processing means comprises;

information input means for applying information to be compared with the information read out of the card by said reader means; and comparison means for comparing the information read out of said card and the information applied by said information input means;

said recording means being driven by an output of said comparison means.

24. An apparatus according to claim 23, wherein said sheet carrying means is so arranged that the sheet and the card may be placed in a superposed relationship, and said recording means includes urging means for press-contacting the sheet and the card to record embossed characters of the card onto the sheet.

25. An apparatus according to claim 24, wherein said urging means includes a roller.

26. An apparatus according to claim 22, wherein said sheet carrying means is provided with locking means for preventing movement of the sheet relative thereto, said locking means being movable to allow the sheet to be moved on the sheet carrying portion, when said card carrying means is placed at the second position thereof.

27. A card processing apparatus comprising:

a housing having an opening therein;

card carrying means having a portion for carrying a card which bears information recorded thereon, said card carrying means being movable in said opening;

reader means, located within said housing and outside said card carrying means, for reading the information recorded on the card;

card processing means for processing the card after the information of the card is read therefrom;

transport means for transporting said card carrying means into said housing to move said card carried on said card carrying portion to said reader means;

sheet carrying means for carrying a sheet, provided on said card carrying means; and separating means for separating the card on said card carrying means and the sheet on said sheet carrying means when said card carrying means is moved in the opening of said housing toward inside of the housing.

28. An apparatus according to claim 27, wherein said separating means includes a member having an inclined portion.

29. A card processing apparatus comprising:

a housing having an opening therein;

card carrying means having a portion for carrying a card which bears information recorded thereon, said card carrying means being movable in said opening;

reader means, located within said housing for reading the information recorded on the card;

card processing means for processing the card after the information of the card is read therefrom;

transport means for transporting said card carrying means into said housing to move said card carried on said card carrying portion to said reader means;

card guiding means, disposed between said card carrying means and said reader means, for guiding the card therebetween;

sheet carrying means for carrying a sheet, provided on said card carrying means; and separating means for separating the card on said card carrying means and the sheet on said sheet carrying means when said card carrying means is moved in the opening of said housing toward inside of the housing.

30. An apparatus according to claim 29, wherein said separating means includes a member having an inclined portion.

31. A card processing apparatus comprising:
a housing having an opening therein;
card carrying means having a portion for carrying a card which bears information recorded thereon, said card carrying means being movable relative to said opening between a first position wherein said card carrying means is within said housing and a second position wherein at least a portion of said card carrying means is out of said housing through said opening;
reader means, located within said housing and outside said card carrying means, for reading the information recorded on the card;
card processing means for processing the card after the information of the card is read therefrom;
transport means for transporting said card carrying means into said housing to move said card carried on said card carrying portion to said reader means;
position detecting means for detecting whether said card carrying means is at said first position;
process detecting means for detecting whether the card has been processed by said card processing means;
preventing means for preventing said card carrying means from movement in accordance with said position detecting means and said process detecting means;
sheet carrying means, provided on said card carrying means, for carrying a sheet; and
separating means for separating the card on said card carrying means and the sheet on said sheet carrying means when said card carrying means is placed at the first position thereof.

32. An apparatus according to claim 31, wherein said separating means includes a member having an inclined portion.

33. A card processing apparatus comprising:
a housing having an opening therein;
card carrying means having a portion for carrying a card which bears information recorded thereon, said card carrying means being movable relative to said opening between a first position wherein said card carrying means is within said housing and a second position wherein at least a portion of said card carrying means is out of said housing through said opening;
reader means, located within said housing and outside said card carrying means, for reading the information recorded on the card;
card processing means for processing the card after the information of the card is read therefrom;
transport means for transporting said card carrying means into said housing to move said card carried on said card carrying portion to said reader means;
card guiding means, disposed between said card carrying means and said reader means, for guiding the card therebetween;
position detecting means for detecting whether said card carrying means is at said first position;
process detecting means for detecting whether the card has been processed by said card processing means;
preventing means for preventing said card carrying means from movement in accordance with said position detecting means and said process detecting means;
sheet carrying means, provided on said card carrying means, for carrying a sheet; and
separating means for separating the card on said card carrying means and the sheet on said sheet carrying means when said card carrying means is placed at the first position thereof.

34. An apparatus according to claim 33, wherein said separating means includes a member having an inclined portion.

35. A card processing apparatus comprising:
a housing having an opening therein;
card carrying means having a portion for carrying a card which bears information recorded thereon, said card carrying means being movable relative to said opening;
reader means, located within said housing and outside said card carrying means, for reading the information recorded on the card;
card processing means for processing the card after the information of the card is read therefrom;
transport means for transporting said card carrying means into said housing to move said card carried on said card carrying portion to said reader means;
sheet carrying means, provided on said card carrying means, for carrying a sheet; and
recording means for recording embossed characters on the card onto a sheet carried on said sheet carrying means when said card carrying means is moved toward outside of said housing.

36. An apparatus according to claim 35, wherein said card processing means comprise:
information input means for applying information to be compared with the information read out of the card by said reader means; and
comparison means for comparing the information read out of said card and the information applied by said information input means;
said recording means being driven by an output of said comparison means.

37. An apparatus according to claim 36, wherein said recording means includes urging means for press-contacting the sheet and the card.

38. An apparatus according to claim 37, wherein said urging means includes a roller.

39. A card processing apparatus comprising:
a housing having an opening therein;
card carrying means having a portion for carrying a card which bears information recorded thereon, said card carrying means being movable relative to said opening;
reader means, located within said housing and outside said card carrying means, for reading the information recorded on the card;
card processing means for processing the card after the information of the card is read therefrom;
transport means for transporting said card carrying means into said housing to move said card carried on said card carrying portion to said reader means;
card guiding means, disposed between said card carrying means and said reader means, for guiding the card therebetween;
sheet carrying means, provided on said card carrying means, for carrying a sheet; and recording means for recording embossed characters on the card onto a sheet carried on said sheet carrying means when said card carrying means is moved toward outside of said housing.

40. An apparatus according to claim 39, wherein said card processing means comprises;

information input means for applying information to be compared with the information read out of the card by said reader means; and comparison means for comparing the information read out of said card and the information applied by said information input means;

said recording means being driven by an output of said comparison means.

41. An apparatus according to claim 40, wherein said recording means includes urging means for press-contacting the sheet and the card.

42. An apparatus according to claim 41, wherein said urging means includes a roller.

43. A card processing apparatus comprising:

a housing having an opening therein;

card carrying means having a portion for carrying a card which bears information recorded thereon, said card carrying means being movable relative to said opening between a first position wherein said card carrying means is within said housing and a second position wherein at least a portion of said card carrying means is out of said housing through said opening;

reader means, located within said housing and outside said card carrying means, for reading the information recorded on the card;

card processing means for processing the card after the information of the card is read therefrom;

transport means for transporting said card carrying means into said housing to move said card carried on said card carrying portion to said reader means;

limiting means, provided on said card carrying means, for limiting movement of the card when said card carrying means is at the second position thereof, and allowing movement of the card when said card carrying means is at the first position.

44. An apparatus according to claim 43, wherein said limiting means is controlled by displacing means.

45. An apparatus according to claim 44, wherein said displacing means includes a base member having a horizontal portion and an inclined portion.

46. An apparatus according to claim 44, wherein said displacing means includes a plurality of rollers fixed in said housing.

47. An apparatus according to claim 44, wherein said displacing means includes a roller movable with a plunger.

* * * * *

UNITED STATES PATENT AND TRADEMARK OFFICE
CERTIFICATE OF CORRECTION

PATENT NO. : 4,136,819
DATED : January 30, 1979
INVENTOR(S) : Tomohiko Torita, et al It is certified that error appears in the above-identified patent and that said Letters Patent are hereby corrected as shown below:

Column 2, line 38, delete "A through 14B,".

Signed and Sealed this

First Day of May 1979

[SEAL]

Attest:

RUTH C. MASON
Attesting Officer

DONALD W. BANNER
Commissioner of Patents and Trademarks